United States Patent
Lal et al.

(10) Patent No.: US 7,476,865 B2
(45) Date of Patent: Jan. 13, 2009

(54) RADIOACTIVE DECAY BASED STABLE TIME OR FREQUENCY REFERENCE SIGNAL SOURCE

(75) Inventors: Amit Lal, Fairfax, VA (US); Hui Li, Ithaca, NY (US); Hang Guo, Ithaca, NY (US); Shankar Radhakrishnan, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 11/431,506

(22) Filed: May 11, 2006

(65) Prior Publication Data

US 2006/0255281 A1 Nov. 16, 2006

Related U.S. Application Data

(60) Provisional application No. 60/679,979, filed on May 12, 2005.

(51) Int. Cl.
*G04F 5/14* (2006.01)
*G06F 1/04* (2006.01)
(52) U.S. Cl. .................. 250/370.11; 368/155; 368/156
(58) Field of Classification Search ............ 250/370.11, 250/252.1; 368/155, 156
See application file for complete search history.

(56) References Cited

U.S. PATENT DOCUMENTS 4,676,661 A * 6/1987 Keenan et al. ............... 368/156
6,567,346 B2 * 5/2003 Aton et al. .................. 368/155

OTHER PUBLICATIONS

Radhakrishnan S., Lal A.; Radioactive Counting Clocks; Jun. 2006; International Frequency Control Symposium and Exposition, 2006 IEEE; pp. 307-311.*

* cited by examiner

*Primary Examiner*—David P Porta
*Assistant Examiner*—David S Baker
(74) *Attorney, Agent, or Firm*—Jones, Tullar & Cooper, PC

(57) ABSTRACT

A signal source for use as a frequency source or time keeping signal source includes a radioactive emission source generating a substantially periodic signal corresponding to a radioactive material's disintegration rate. A radioactive emission detector generates a radioactive emission detection signal and, to stabilize the detected periodic signal, a dead time controlling attenuator blanks or shuts off the radioactive emission detection signal for a selected dead time interval in response to each detected radioactive emission (i.e., a detected signal pulse or signal component) generated by the source. The dead time controlling attenuator output provides a long-term and short-term a stable periodic signal.

17 Claims, 8 Drawing Sheets

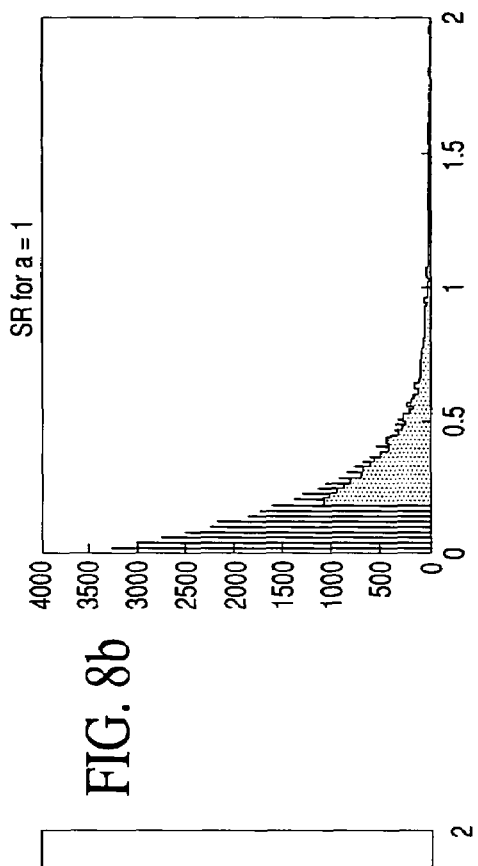
FIG. 8a
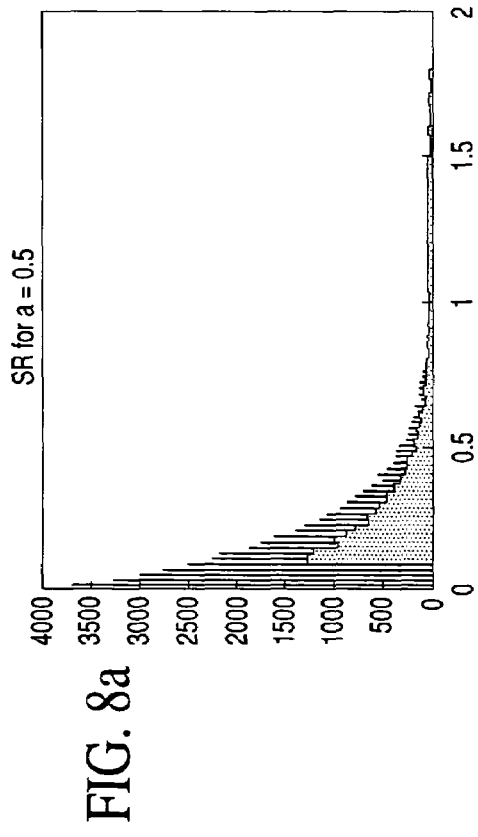
FIG. 8b
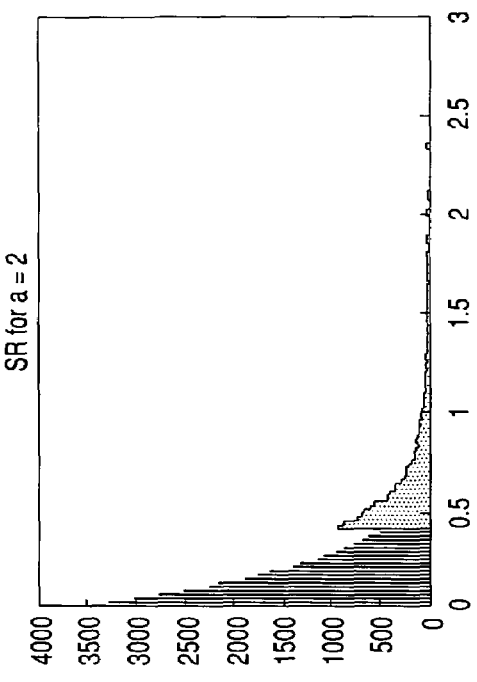
FIG. 8c
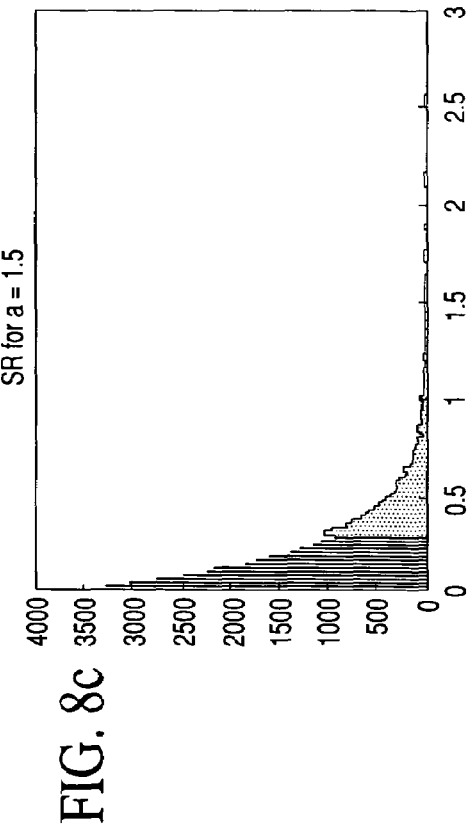
FIG. 8d
Experimental Time interval histogram before ( ——— ) and after ( ▨ ) SR confirming the probability density function given in equation 40

RADIOACTIVE DECAY BASED STABLE TIME OR FREQUENCY REFERENCE SIGNAL SOURCE

BACKGROUND OF THE INVENTION

This application is a continuation of and claims priority to the filing date of U.S. provisional application Ser. No. 60/679,979, filed May 12, 2005, the entire disclosure of which is hereby incorporated herein by reference.

FIELD OF THE INVENTION

The present invention relates in general, to a system and method for precise and stable time keeping and, more particularly to a signal source utilizing a radioactive decay rate as its reference.

DISCUSSION OF THE PRIOR ART

The need for more and more precise and stable time-keeping for a wide variety of applications has been on the rise, particularly in applications such as digital communications (such as for cell phone base stations, point-to-point communication, internet security, etc), global positioning systems (GPS) and, more critically, for security and identification applications such as friend-or-foe (IFF) communications.

There are a wide variety of potential applications for enhanced time or frequency reference signal sources, which may be referred to as time bases or clocks. One example of the need for precise, stable time keeping is found in the development of enhanced, jam-resistant GPS receivers. The signals broadcast by GPS satellites are extremely low in power, making the GPS receivers highly susceptible to intentional jamming signals as well as to unintentional interference from sources transmitting in the same frequency band. For example, some GPS signals are transmitted over a wide bandwidth, making them considerably less susceptible to jamming than normal GPS signals. Typically, however, these broadband signals incorporate a code that repeats only every seven days, so that broadband receivers usually have to first lock onto the normal signal, and this eliminates the anti-jam advantage of the larger-bandwidth signal. If the broadband receiver's local clock were capable of determining the time to within 1 millisecond (ms) over several days, its search for the GPS signals would be narrowed so the receiver could, theoretically, lock onto the broadband signal directly, without first having to acquire the normal signal. Thus, if a more accurate clock were available, the receiver would be significantly more resistant to jamming.

Three important characteristics are necessary to realize a 'good' time base or clock: (1) long and short-term frequency stability (usually measured in Allan variance and phase noise of the frequency source); (2) physical size of the clock; and (3) the power consumed by the clock. Historically (and mainly to satisfy criterion 1), clocks based on electromagnetic oscillations of atoms have provided the most precise method of timing events lasting longer than a few minutes. So precise are these "atomic" clocks, that in 1967 the second was redefined to be the duration required for a cesium (Cs) atom in a particular quantum state to undergo exactly 9,192,631,770 oscillations. While the long-term precision of atomic clocks is unsurpassed, the size and power required to run them has prevented their use in a variety of areas, particularly in those applications requiring portability or battery operation. The NIST F-1 primary standard, for example, occupies an entire table and consumes several hundred watts when operating.

The state of the art in compact commercial atomic frequency references is rubidium (Rb) vapor-cell devices with volumes near 100 cm$^3$ operating on a few watts of power; such references cost about $1,000.00.

Recently, miniature atomic clocks have been based on Microelectromechanical systems (MEMS) technology which offers advantages such as smaller size, an improvement in the device power usage due to reduced parasitic heat dissipation (as the heat lost to the environment via the device surface is smaller), and high-volume, wafer-based production methods, which may substantially reduce cost. In spite of these advantages, the power consumed by currently envisioned MEMS-based atomic clocks hasn't been reduced enough to permit their use in applications such as portable battery operated systems in long-term operations, including, for example, week-long missions for the military, months-long working of communication base units or even year/decade long operation for sensor node applications.

Prior art atomic clocks typically include two main functional components. The first component is a physics package, which is the heart of the clock and contains an atomic (usually Rb or Cs) vapor cell that acts as a frequency reference to determine the clock output frequency. The second component is a local oscillator (LO) which generates an oscillating microwave signal, whose frequency is possibly quite unstable, which signal is supplied to the physics package. The physics package generates a signal based on hyperfine transitions of electrons of the outermost shells of the source atoms—a constant of nature—so this signal is extremely long-term stable (in fact, substantially invariant with time). However, the signal source suffers from short-term instabilities due, for example, to shot-noise from photon sources, or to physical environment fluctuations (such as pressure, temperature, magnetic field, etc). The LO (usually a quartz or MEMS oscillator) provides the necessary short-term stability, and hence the two, when appropriately 'locked' to each other, produce both a short-term and long-term precise and stable atomic clock system.

Unfortunately, this precision and stability come at a cost; as noted above conventional atomic clocks, even when supplemented with MEMS LO sections, take up excessive space and consume excessive energy for many important applications.

Solid state resonators (such as RF resonators based on quartz and silicon) are portable and energy efficient and so are often used in wrist watches and the like, but cannot provide an adequate reference signal because they have observable and random aging effects which cause their frequencies to shift in a non-predictable manner.

There is a need, therefore, for a stable and precise time or frequency reference that overcomes the problems with the prior art.

SUMMARY OF THE INVENTION

An object of the present invention is to provide a compact, energy efficient, stable and precise time or frequency reference.

Briefly, in accordance with the present invention, a short- and long-term stable clock is provided by locking a local oscillator to a radioactive decay source that is a constant of nature by way of a control loop to provide an error signal from the radioactive source to regulate the oscillator.

More particularly, a signal source for use as a frequency source or as a time keeping signal source includes a radioactive emitter that generates a substantially periodic signal corresponding to the decay rate of a selected radioactive material. The signal source includes a radioactive emission detector that receives the radioactive decay particles emitted by the radioactive material and generates a substantially periodic radioactive emission detection signal. In a preferred form of the invention, a dead time controlling attenuator is connected to the detector to blank, or shut off, the radioactive emission detection signal from the detector for a selected "dead time" interval in response to each detected radioactive emission in order to stabilize the detector output signals. This output signal is then used as a reference for the control loop to regulate the local oscillator to provide both long-term and short-term stable periodic clock signals.

The emissions from a radioactive source are a constant of nature, as the rate of radioactive disintegrations (i.e., activity or rate) is a constant for a given amount of material. For radioactive sources of large half-lives, the rate does not change appreciably with age, as there are no physical effects that change the rate for a given amount of material. Thus, a radioactive source can replace the physics package of an atomic clock to provide the necessary long-term stability for a reference signal source or counting clock.

A radioactive clock has several advantages over a conventional atomic clock; for example, the radioactive decay of a radioactive isotope is a spontaneous process and hence does not consume any active power. A clock based on radioactive decay therefore, needs only enough power to sense or interrogate a radioactive signal source. This makes such a clock particularly suitable for battery-operable portable systems and for extremely long-term applications (weeks to decades). In contrast, the bulk of the power consumed by an atomic clock is consumed by a plasma or laser source that is used to produce resonance. Furthermore, the rate of decay of a radioactive isotope is a constant and is independent of ambient conditions such as temperature, pressure, magnetic field and electric fields, although the latter two to a limited extent relative to atomic clocks, making a clock based on radioactive emissions stable for long-term missions without parasitic effects such as unpredictable drifts of the kind observable even in atomic clock physics packages. Although the rate of decay of a radioactive source suffers from a drift due to the half-life of the radioisotope, this effect is well defined and predictable and can be systematically corrected.

The rate of decay of a radioactive isotope, for any time much less than the half-life of the isotope, is a constant, and variation is negligibly small. For example, for the radioisotope nickel-63 ($Ni^{63}$), a beta emitter, the half-life is approximately 100 years, so its decay rate can be considered invariant with time for operating intervals of up to a few days and can be used for several decades by incorporating appropriate drift corrections. The radioactive decay process can be modeled as a Poisson process, and accordingly the Allan deviation of counts, over very small times, is large, so even a radioactive source can be short-term unstable, requiring it to be locked to a short-term stable LO for use as a stable and precise frequency or time reference.

A simple counting clock architecture in accordance with the present invention utilizes a thin film beta emitter, such as $Ni^{63}$ as its radioactive source, although other thin-film or bulk beta emitters such as tritium, or alpha or gamma emitters may be substituted for it. The radioactive source is coupled to a detector that detects each radioactive beta emission from the radioactive source and may consist of a reverse-biased PIN (p-silicon—intrinsic silicon—n-silicon) diode acting as an avalanche photodiode.

The PIN diode output signal is preferably processed through three stages; namely, a first amplifier stage feeding a second waveform shaping stage that, in turn, feeds a third buffer stage. Thus, the PIN diode output is sensed in the first stage by a charge sensitive amplifier that converts the normally low amount of charge generated per beta emission into a detectable voltage level. The waveform generated at the output of the charge sensitive amplifier is preferably shaped in the second stage to a square wave output with 0-10 V high and low levels to enable reliable operation of a counter. The third, or buffer stage at the output of the detector is used to prevent loading of the pulse-shaping amplifier, and supplies the output signal to a first counter $N_1$.

The local oscillator, which is coupled to the radiation signal source by way of the control loop, preferably is a voltage-controlled oscillator (VCO), and its output is supplied to a second signal detector, which incorporates a second counter $N_2$. The outputs of the two counters $N_1$ and $N_2$ are supplied to a digital subtracter circuit. Counter $N_1$ counts the number of radioactive emissions and $N_2$ counts the number of cycles at the output of the LO. These counters may be N-bit shift registers, where $2^N$ is larger than the number of counts generated during the operation of the clock. The difference between $N_1$ and $N_2$ is calculated in the digital subtracter (count $N_1$–count $N_2$), which preferably incorporates standard logic gates designed for high speed and low power.

In an alternative embodiment, the two counters and subtracter can be replaced by an up-down counter, in which the bit value of a shift register shifts up one value when a radioactive event is detected and shifts down one value after each cycle of the LO output.

The output of the subtracter (or up/down counter) is supplied to a digital-to-analog (D-A) converter to generate an analog signal for use in a control loop to generate a feedback control signal to control the voltage-controlled local oscillator (LO/VCO). Digital to Analog (D-A) converters are well known and are commonly used for high-speed switching in communication networks. A commercially available D-A converter such as an Analog Devices AD5382 can be used for this purpose.

The control loop circuit generates an error, or feedback, signal based on the difference between $N_1$ and $N_2$, and adjusts the VCO frequency to correct for long-term variations or drift in the VCO output signal using the signal from the radioactive source as the standard. The simplest implementation of the control loop is the use of a single pole RC filter, where the RC time constant determines the time frame over which the radioactive clock corrects the VCO frequency. This value has to be optimized depending on the short term stabilities for the VCO and the counting clock. This type of control circuit is similar to those used in Atomic clocks.

The modeling of the radioactive decay as a Poisson process for the counting clock of the invention gives insights into ways of decreasing the number of emissions, or activity of the source, and time required to achieve a required Allan deviation in the frequency of the clock so as to overcome the need for extremely high speed detectors and to allow implementation of a radioactive clock that has a low power consumption. An important characteristic of the Poisson process is that the time intervals between successive decay events (hereafter, events) have an exponential distribution. It is this distribution, or variation, in the time intervals between successive pulses that causes the standard deviation in the counts of the counting clock. This distribution is equivalent to having a pure frequency source of a selected decay rate frequency with Poisson characteristic noise.

In order to overcome the problem of time interval variation, a dead time inserter (i.e., a device that causes each radioactive event to disable the detector for a constant time, called the dead-time, $T_{dead}$) is deployed between the radioactive source and the counter. There are two types of dead time: extended, and non extended, and these differ in their response to pulses arriving during a dead time. During a non-extended dead time, arriving pulses have no effect at all, while during an extended dead time, arriving pulses extend the dead time by $T_{dead}$, measured from the last arrival time.

It has been found that due to the exponential distribution of the time intervals of the radioactive decay process, most of the events occur within very short intervals of one-another. This requires very fast detectors to record events without missing any. In the absence of a sufficiently fast detector, there would be unpredictable counting losses that could lead to errors. To overcome such unpredictability of the counting losses, in accordance with the present invention, an artificial dead time controlling attenuator, or dead time inserter, is placed in the detector. The effects of introducing such an inserter, which may also be referred to as a stochastic resonator (SR), include:

1. Decreasing the average count rate; this occurs since pulses are deleted by the dead-time inserter;
2. Causing the output pulses to tend to occur more periodically (compared to the original radioactive decay process) with a period close to $T_{dead}$; and
3. Changing the probability density function of time intervals from an exponential distribution to that of a truncated exponential distribution.

A simple way to implement a dead-time controlling attenuator (or SR) is the use of a monostable multivibrator and a bistable multivibrator in series.

In addition to improvements in the Allan deviation provided by the use of a dead time controlling actuator, the detector only needs to work with a frequency greater than $1/T_{dead}$. In the example considered above, the detector needs to work at a frequency of ~1/200 ns=5 MHz, and such a detector would consume very low power. The reduction in Allan deviation for a detector incorporating SR has been verified by the experimental measurement of counts at the output of a radioactive detector having dead time. The Allan deviation values of a detector with and without SR for a counting clock having a radioactive source are comparable to that of a chip-scale atomic clock (CSAC). Further, due to the immunity to environmental fluctuations of the radioactive source clock of the present invention, it is truly stable for longer times than CSACs, which typically exhibit a turn-around point that corresponds to a drift in the frequency due to physical package aging and environmental effects.

Broadly speaking, the preferred embodiment of the present invention makes available a radioactive signal source for generating a stable periodic signal that is available for use as a frequency source or time keeping signal source. The device includes a radioactive emission source generating a disintegration rate signal based on the disintegration, or decay, rate of the radioactive source. A detector responsive to that decay signal generates a radioactive emission detector signal. A dead time controlling attenuator (or SR) responds to the radioactive emission detector signal to attenuate it for a selected dead time interval signal component (or event), where the dead time controlling attenuator output provides the desired stable radioactive emission periodic signal.

The method of the present invention includes operating a signal source to generate a substantially periodic radioactive emission detector signal, and then attenuating the radioactive emission detection signal for a selected dead time interval in response to a periodic signal component (or event) to provide a stable radioactive emission periodic signal.

BRIEF DESCRIPTION OF THE DRAWINGS

The foregoing and additional features and advantages of the present invention will become apparent upon consideration of the following detailed description of a specific embodiment thereof, taken in conjunction with the accompanying drawings, wherein like reference numerals in the various figures are utilized to designate like components, in which:

FIGS. 8a-8d illustrate an experimental time interval histogram before and after dead time attenuation (SR);

DESCRIPTION OF THE PREFERRED EMBODIMENT

Figure 1:
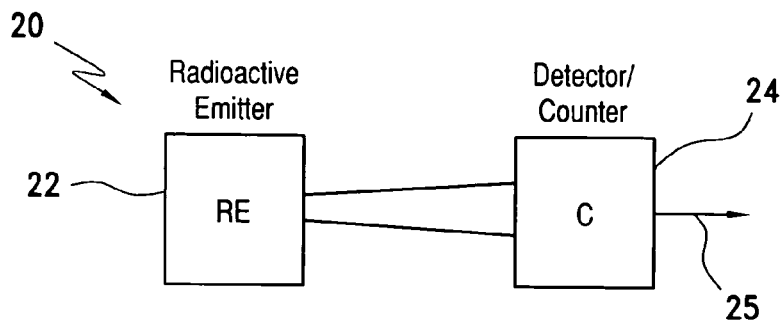
FIG. 1 is a schematic of a simple radioactive source placed in close proximity to a detector and counter, in accordance with the present invention.

Turning now to a more detailed description of the invention, a radioactive decay based reference signal source 20 is illustrated in FIG. 1 as incorporating a radioactive emitter 22 and a detector, or counter, 24. The emitter 22 preferably is a radioactive beta emitter isotope, such as a thin film of $Ni^{63}$, which decays to emit particles periodically at a rate corresponding to the material's disintegration rate. Radioactive emission detector 24 responds to the emitted particles to generate a corresponding periodic detection signal at its output 25. As is well known, such a detector may consist of a photodetector which responds to each emitted beta particle to produce an output signal, and in accordance with the present invention, this radioactive source serves as the basis for a stable time or frequency reference signal source which may function as an accurate, stable clock which has numerous advantages over known atomic clocks.

Figure 3:
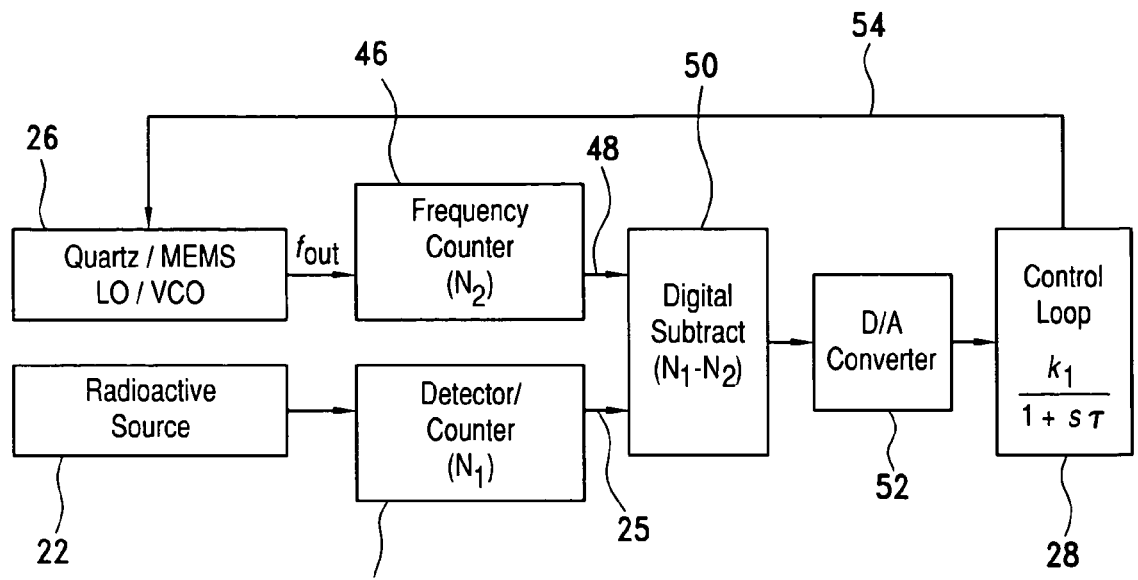
FIG. 3 is a schematic diagram of a counting clock having a control loop circuit for 'locking' a local oscillator to a radioactive source to realize a simple counting clock that is short-term and long-term stable, in accordance with the present invention.

A simple counting clock architecture constructed in accordance with the present invention is illustrated in FIG. 3. The clock utilizes the source 20 in combination with a locking local oscillator 26 and a control loop 28 (to be described) to produce a stable clock signal. The control loop compares the outputs of the source 20 and the local oscillator 26 to generate an error signal with appropriate gain to correct the frequency output of the LO, thereby reducing its long-term frequency variations or drifts. Over very short times (t<<T, the loop time constant), error signals from the control loop are small and hence the stability of the output frequency ($f_{out}$ at the output of the LO 26) of the clock depends on the frequency stability of the LO 26. Over long periods of time (t>>T) the error signal generated in the control loop is the difference between the frequency of the LO and the decay rate of the radioactive source. Thus, the long-term stability of the clock is determined by the long-term stability of the radioactive source by locking the short-term stable LO to the long-term stable radioactive source. Here the terms short term and long term are defined with respect to the loop time constant, T.

Figure 4:
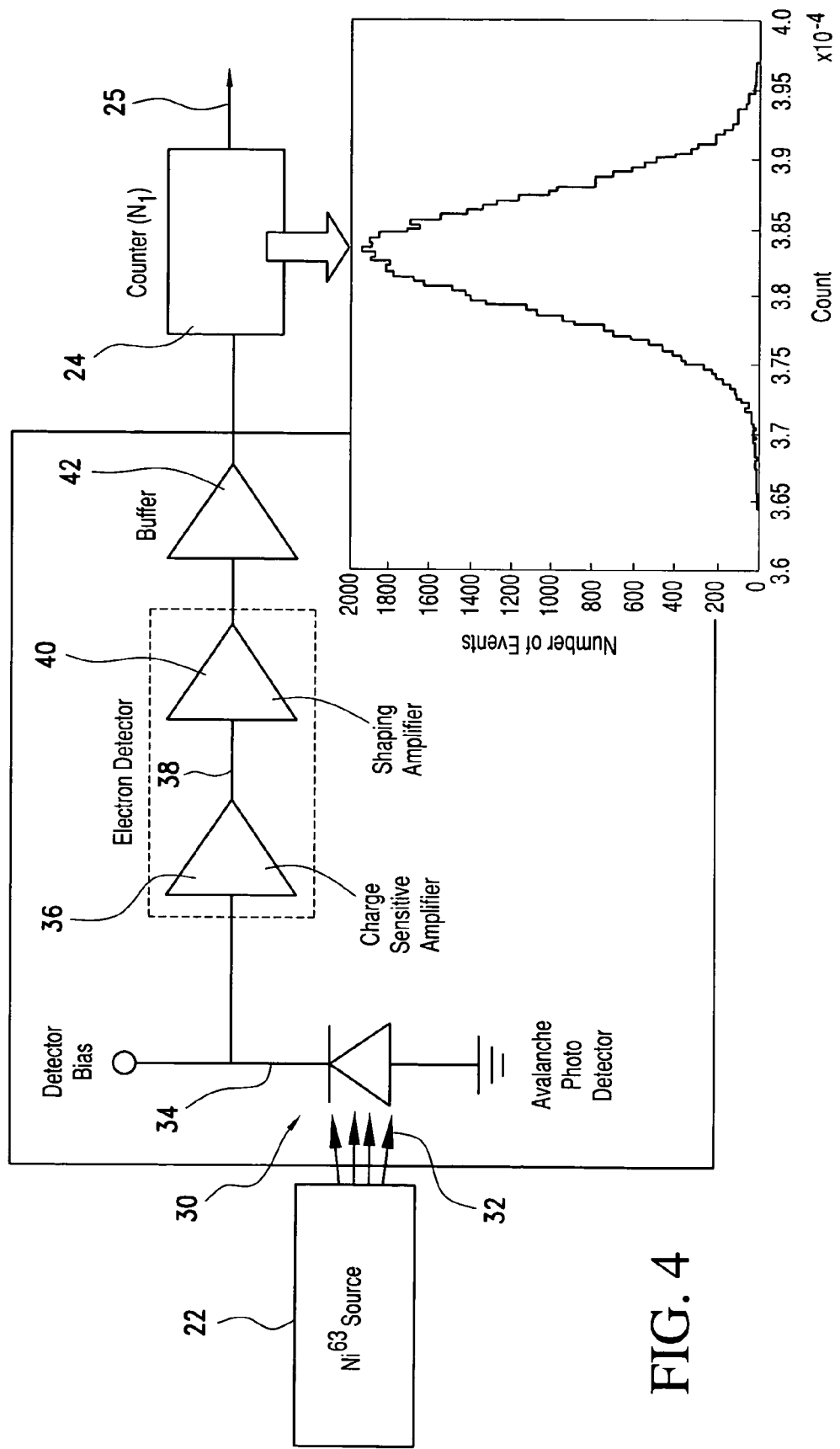
FIG. 4 is a schematic diagram of a detector/counter for the circuit of FIG. 3.

As illustrated in FIGS. 3 and 4, the radioactive source 22 preferably consists of a thin film beta emitter. Although in this exemplary embodiment, a thin film $Ni^{63}$ is used, other beta emitters such as Tritium may be utilized, or alpha or gamma emitters may be used. The difference between different radioactive sources is the difference in average electron energy emitted and the half-life of the radioactive species. $Ni^{63}$ is most conveniently electroplated on a substrate to have an activity, or emission rate, of ~25 $mCi/cm^2$ of area.

Detector counter 24 generates a signal on line 25 in response to each radioactive beta emission from radioactive emitter 22. A simple schematic of the detector portion of detector/counter 24 is illustrated in FIG. 4, where a reverse biased PIN diode 30, acting as an avalanche photodiode, receives incoming high energy beta particles 32, which create electron hole pairs in the depletion region of the diode 30, the number of pairs being dependent on the material and the diode design. It is important that the depletion region width be maximized so as to maximize the area over which the electrons can be detected. A detected electron will produce a current or a sudden burst of charge at the cathode 34 of the diode 30. This charge can be sensed using a charge sensitive amplifier 36, connected to cathode 34, which converts the normally low amount of charge generated per beta emission into a detectable voltage. The waveform generated at output 38 of the charge sensitive amplifier is supplied to a shaping amplifier 40, where it is shaped to a square wave output form, with 0 and 10 V low and high levels, respectively, for example, to enable reliable operation of the counter. The output of amplifier 40 is supplied to a buffer 42 that is used to prevent loading of the pulse-shaping amplifier.

As illustrated in FIG. 3, the local oscillator 26, which preferably is a voltage controlled oscillator (LO/VCO) produces an output signal $f_{out}$ on line 44 that is supplied to a second detector/counter 46 to produce a corresponding output signal on output line 48. Counters 24 and 46 ($N_1$ and $N_2$), respectively are connected to corresponding inputs of a digital subtracter circuit 50. The first counter 24 counts the number of radioactive emission events from source 22, while the second counter 46 counts the number of cycles at the output of LO/VCO 26. Counters 24 and 46 are easily realized using N-bit shift registers, where $2^N$ is larger than the number of counts generated during the operation of the clock. The difference between $N_1$ and $N_2$ is calculated using the digital subtracter 50, which can be implemented using standard logic gates designed for high speed and low power. Alternatively, the counters 24, 46 and the subtracter 50 can be replaced by an up-down counter, in which the bit value of a shift register is shifted up one value when a radioactive event is detected from source 22 and is shifted down one value after each cycle of the LO/VCO 26. A description of up-down counters can be found in most digital design books. A practical up-down counter can be built from an IC 4510 or using a general-purpose microprocessor such as Atmel AT90S1200. The implementation of an up-down counter using IC 4510 and an Atmel microcontroller may be found, respectively, in the following publications: "4510-BCD Up-down counter IC datasheet and application notes by Phillips semiconductors" (from Web URL: http://www.standardics.philips.com/datasheets/) and "Atmel AT90S1200 manual and datasheets by Atmel" (from web URL: http://www.atmel.com). A tunable oscillator such as LTC6907 from Linear Technology can be used to realize the VCO 26. A description of the use of an LTC6907 oscillator may be found in the publication "Datasheet for Micropower, 40 kHz to 4 MHz Resistor Set Oscillator in SOT-23 by Linear Technology" (from web URL: http://www.linear.com).

The difference signal obtained by subtracter 50 is supplied to a digital-to-analog (D-A) converter 52, which preferably is a conventional D-A converter of the type commonly used in high-speed switching in communication networks, that converts the digital value in subtracter 50 to an analog voltage signal on output line 52. A commercially available D-A converter such as AD5382 from Analog Devices can be used for this purpose.

The control loop circuit 28 receives the analog signal derived from the output of the subtracter 50 and, in response, generates an error signal on line 54 that is supplied to the LO/VCO 26 to vary the frequency of tunable oscillator 26. This error signal corrects for long-term variations or drift in the LO/VCO using the signal from the radioactive source 22 as a standard, to produce the long- and short-term stable output signal $f_{out}$. The simplest implementation of the control system or loop circuit 28 is a single-pole resistor-capacitor (RC) filter, where the time constant RC determines the time frame over which the radioactive source corrects the VCO frequency. The RC time constant value has to be selected in accordance with the short term stabilities of the VCO 26 and the source 22. A description of this type of control can be found in texts on Atomic clocks, for example, the text by J. Vanier and C. Audoin, "Quantum Physics of Atomic Frequency Standards", IOP Publishing, 1989, New York, N.Y.

The key to realizing the short-and long-term stable clock of the present invention is to lock-on the Local Oscillator (LO) to a periodic signal source that is based on a constant of nature and so does not vary with passing time. Solid-state resonators (such as RF resonators based on quartz, and silicon) do not fall under this category as they have observable and random aging effects that cause their frequencies to shift in a nonpredictable manner.

Emissions from a radioactive source are, advantageously, a constant of nature, as the rate of radioactive disintegrations (activity or, simply, rate) is a constant for a given amount of radioactive material. Radioactive sources do not age, as there are no physical effects that change the rate of radioactive disintegrations for a given amount of material. Thus a radioactive source can be configured to provide a functional replacement for the physics package of an atomic clock and to provide the necessary long-term stability for a reference signal generator or clock—the radioactive counting clock or simply counting clock of the present invention.

The radioactive decay process can be completely modeled as a Poisson process corresponding to a decay rate denoted by $\lambda$. For any time $t \ll T_{1/2}$ (half-life of the radioisotope), $\lambda$ is a constant and variation in $\lambda$ is negligibly small. The beta ($\beta$) emitter $Ni^{63}$ has a half life, $T_{1/2}=\sim 100$ yrs. Its rate can thus be considered substantially invariant with time for up to a few multi-year long operations. Accordingly, the probability of $X=1$ event occurring in any time interval dt is given by:

$$P(X = 1, dt) = \lambda dt \tag{1}$$

$$P(X = 0, dt) = 1 - \lambda dt \tag{2}$$

$$P(X = k, t) = \frac{(\lambda t)^k e^{-\lambda t}}{k!} \tag{3}$$

As a simple case, if a detector 24 of radioactive beta particles is placed in close proximity to a $Ni^{63}$ radioactive emitter (RE) 22 (as in FIG. 1) of rate $\lambda$, the average number of counts in time t and the standard deviation in counts can be given by:

$$\overline{k} = \lambda t \tag{4}$$

$$\sigma_k = \sqrt{\lambda t} \tag{5}$$

The two point Allan deviation of counts can be expressed as:

$$\sigma_y = \frac{1}{\sqrt{\lambda t}} \tag{6}$$

Figure 2:
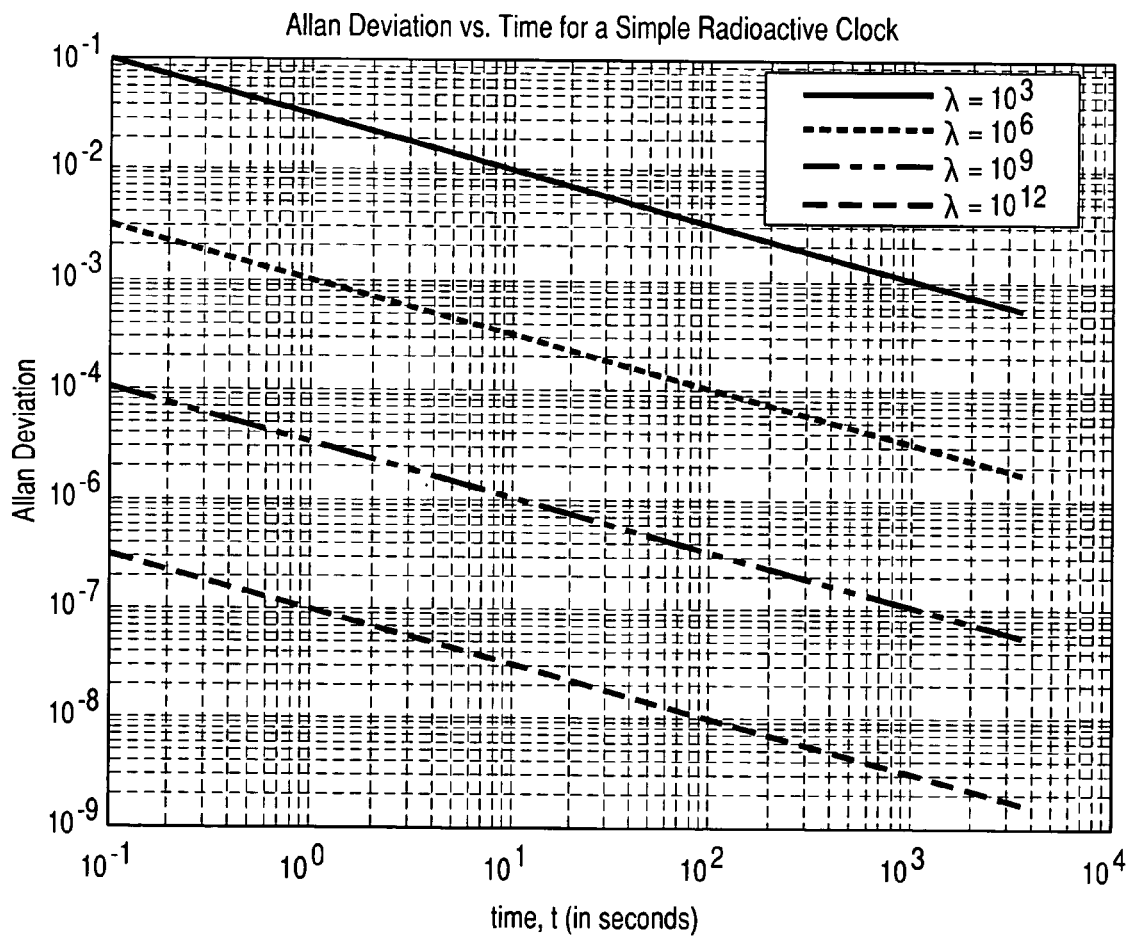
FIG. 2 illustrates the Allan deviation of counts from a radioactive source of different values of rate (I), as a function of time.

FIG. 2 shows the Allan deviation of radioactive emission source 22 as a function of time for different rates, $\lambda$. The Allan deviation, which is a measure of the stability of the frequency source, goes down as $\sqrt{t}$ and $\sqrt{\lambda}$. As in the case of physics packages for atomic clocks, the Allan deviation at very small times is large (short-term unstable) requiring it to be locked to a short-term stable LO, as described above.

Turning now to an analysis of the clock architecture of FIGS. 3 and 4, a single radioactive source 22 is used, and its output signal is counted by the radioactive detector/counter 24. The counter 24 generates a signal corresponding to a number ($N_1$) that is compared to the output of the second counter 46 ($N_2$). The second counter 36 receives its input from the LO/VCO 26. The two counters supply inputs $N_1$ and $N_2$ to the subtracter 50, and the subtracter output signal is supplied as a feedback in the control loop to regulate VCO 26 to give a stable output frequency.

A differential equation modeling the counting clock or reference signal source of FIG. 3 is as follows. The VCO has a base frequency, $f_0$ and has an output frequency, f given by:

$$f = f_0 + k_1(\lambda t - N_2) \tag{7}$$

The frequency counter of the VCO has a value $N_2$ given by:

$$N_2 = \int_0^t (f_0 + k_1(\lambda t - N_2)) dt \tag{8}$$

$$\frac{dN_2}{dt} = f_0 + k_1(\lambda t - N_2) \tag{9}$$

Rearranging, we arrive at the following differential equation:

$$\frac{dN_2}{dt} + k_1 N_2 = f_0 + k_1 \lambda t \tag{10}$$

This is a linear equation whose solution is given by:

$$N_2 e^{k_1 t} \int (f_0 + k_1 \lambda t) e^{k_1 t} dt \tag{11}$$

$$N_2 = \frac{(f_0 - \lambda)(1 - e^{-k_1 t})}{k_1} + \lambda t \tag{12}$$

$$f = (f_0 - (f_0 - \lambda)(1 - e^{-k_1 t})) \tag{13}$$

$$f_\infty = \lambda \tag{14}$$

Therefore, the above differential equation justified that the center frequency at time infinity is $\lambda$.

Turning now to an analysis of Phase Noise, from equation 7, $$f = f_0 + k_1(\lambda t - N_2) \tag{15}$$

In frequency domain, this is rewritten:

$$F(s) = \frac{f_0}{s} + k_1\left(\frac{-d\Lambda(s)}{ds} - N_2(s)\right) \tag{16}$$

where the capital letters denote the Laplace transforms of the time domain quantities denoted by the corresponding smaller case letters.

Rewriting equation 12, $$N_2 = \frac{(f_0 - \lambda) - (f_0 - \lambda)e^{-k_1 t}}{k_1} + \lambda t \tag{17}$$

$$N_2(s) = \frac{\frac{f_0}{s} - \Lambda(s) - \frac{f_0}{s + k_1} + \Lambda(s + k_1)}{k_1} - \frac{d\Lambda(s)}{ds} \tag{18}$$

Combining equations 16 and 18, one obtains:

$$F(s) = \frac{f_0}{s} + k_1\left(\frac{-d\Lambda(s)}{ds} - \left(\frac{\frac{f_0}{s} - \Lambda(s) - \frac{f_0}{s + k_1} + \Lambda(s + k_1)}{k_1} - \frac{d\Lambda(s)}{ds}\right)\right) \tag{19}$$

On simplification, this results in $$F(s) = \left(\Lambda(s) + \frac{f_0}{s + k_1} - \Lambda(s + k_1)\right) \tag{20}$$

$$F(j\omega) = \left(\Lambda(j\omega) + \frac{f_0}{s + k_1} - \Lambda(j\omega + k_1)\right) \tag{21}$$

Next, analyzing the Allan Deviation of the counting clock, if N represents the number of counts per unit time, then the average value of N is defined as:

$$\overline{N} = \sum_{k=0}^{\infty} \frac{k(\lambda_0 t)^k}{k!} e^{-\lambda_0 t} \qquad (22)$$

and the average value of f is given by $$\overline{f} = \frac{1}{t}\sum_{k=0}^{\infty} \frac{k(\lambda_0 t)^k}{k!} e^{-\lambda_0 t} \qquad (23)$$

$$\overline{f} = \frac{\lambda_0 t}{t}\sum_{k=1}^{\infty} \frac{(\lambda_0 t)^{k-1}}{(k-1)!} e^{-\lambda_0 t} \qquad (24)$$

$$\overline{f} = \lambda_0 \sum_{p=0}^{\infty} \frac{(\lambda_0 t)^p}{p!} e^{-\lambda_0 t} = \lambda_0 \qquad (25)$$

Thus, $\lambda_0$ is the center frequency of the oscillator. ($\lambda$ is the instantaneous rate and $\lambda_0$ is the average rate—a constant).

To estimate the power spectral density, the probability that the frequency is off by a value $f_{off}$ is found:

$$f = \lambda_0 + f_{off} \qquad (26)$$

$$N = (\lambda_0 + f_{off})t \qquad (27)$$

The probability that the number of N being the value above is $$f = \lambda_0 + f_{off} \qquad (28)$$

$$P(f_{off}) = \frac{(\lambda_0 t)^{(\lambda_0 + f_{off})t} e^{-\lambda_0 t}}{(\lambda_0 t + f_{off} t)!} \qquad (29)$$

The square of the probability defined above is the power spectral density of the oscillator spectrum at $f_{off}$. The phase noise at the frequency $f_{off}$ is then $$L(f_{off}) = \frac{1}{\lambda_0} \frac{P^2(f_{off})}{P^2(\lambda_0)} \qquad (31)$$

$$= \frac{1}{\lambda_0}\left[\frac{\frac{(\lambda_0 t)^{(\lambda_0 + f_{off})t} e^{-\lambda_0 t}}{(\lambda_0 t + f_{off} t)!}}{\frac{(\lambda_0 t)^{\lambda_0 t} e^{-\lambda_0 t}}{(\lambda_0 t)!}}\right]^2$$

$$= \frac{1}{\lambda_0}\left[\frac{\frac{(\lambda_0 t)^{\lambda_0 t}(\lambda_0 t)^{f_{off} t}}{(\lambda_0 t + f_{off} t)!}}{\frac{(\lambda_0 t)^{\lambda_0 t}}{(\lambda_0 t)!}}\right]^2$$

$$= \frac{1}{\lambda_0}\left[\frac{\frac{(\lambda_0 t)^{f_{off} t}}{(\lambda_0 t + f_{off} t)!}}{\frac{1}{(\lambda_0 t)!}}\right]^2$$

$$= \frac{1}{\lambda_0}\left[\frac{(\lambda_0 t)!(\lambda_0 t)^{f_{off} t}}{(\lambda_0 t + f_{off} t)!}\right]^2$$

If $\lambda_0 t \gg 1$, one can simplify the above expression as follows $$L(f_{off}) = \frac{1}{\lambda_0}\left[\frac{(\lambda_0 t)!(\lambda_0 t)^{f_{off} t}}{(\lambda_0 t + f_{off} t)!}\right]^2 \qquad (32)$$

$$= \frac{1}{\lambda_0}\left[\frac{(\lambda_0 t)!(\lambda_0 t)^{f_{off} t}}{[(\lambda_0 t + f_{off} t)(\lambda_0 t + f_{off} t - 1)\ldots(\lambda_0 t + 1)](\lambda_0 t)!}\right]^2$$

$$= \frac{1}{\lambda_0}\left[\frac{(\lambda_0 t)^{f_{off} t}}{[(\lambda_0 t + f_{off} t)(\lambda_0 t + f_{off} t - 1)\ldots(\lambda_0 t + 1)]}\right]^2$$

$$= \frac{1}{\lambda_0}\left[\frac{(\lambda_0 t)^{f_{off} t}}{(\lambda_0 t)^{f_{off} t}\left[\left(1 + \frac{f_{off} t}{\lambda_0 t}\right)\left(1 + \frac{f_{off} t - 1}{\lambda_0 t}\right)\ldots\left(\lambda_0 t + \frac{1}{\lambda_0 t}\right)\right]}\right]^2$$

For a 1 mCi radioactive source (for e.g. Ni-63), then, $\lambda_0 = 3.7 \times 10^7$ Hz. Thus for $t > 1$ μs, $\lambda_0 t \gg 1$.

$$L(f_{off}) = \frac{1}{\lambda_0}\left[\frac{1}{\left[\left(1 + \frac{f_{off} t}{\lambda_0 t}\right)\left(1 + \frac{f_{off} t - 1}{\lambda_0 t}\right)\ldots\left(\lambda_0 t + \frac{1}{\lambda_0 t}\right)\right]}\right]^2 \qquad (33)$$

$$= \frac{1}{\lambda_0}\frac{1}{\left(1 + \frac{f_{off} t(1 + f_{off} t)}{2\lambda_0 t}\right)^2}$$

$$= \frac{1}{\lambda_0}\frac{(2\lambda_0)^2}{(2\lambda_0 + f_{off}(1 + f_{off} t))^2}$$

$$= \frac{4\lambda_0}{(2\lambda_0 + f_{off}(1 + f_{off} t))^2}$$

One may calculate the Allan deviation as $$\sigma_y^2(t) = 2\int_0^{\infty} L(f)\frac{1}{1 + \frac{f^2}{f_c^2}}\frac{\sin^4(\pi f t)}{(\pi f t)^2} df \qquad (34)$$

Comparing this with the expected (or ideal) model of Allan Deviation of counts given by (as derived in equation 7).

$$\sigma_y^2(t) = \frac{1}{\lambda_0 t} \qquad (35)$$

Figure 5:
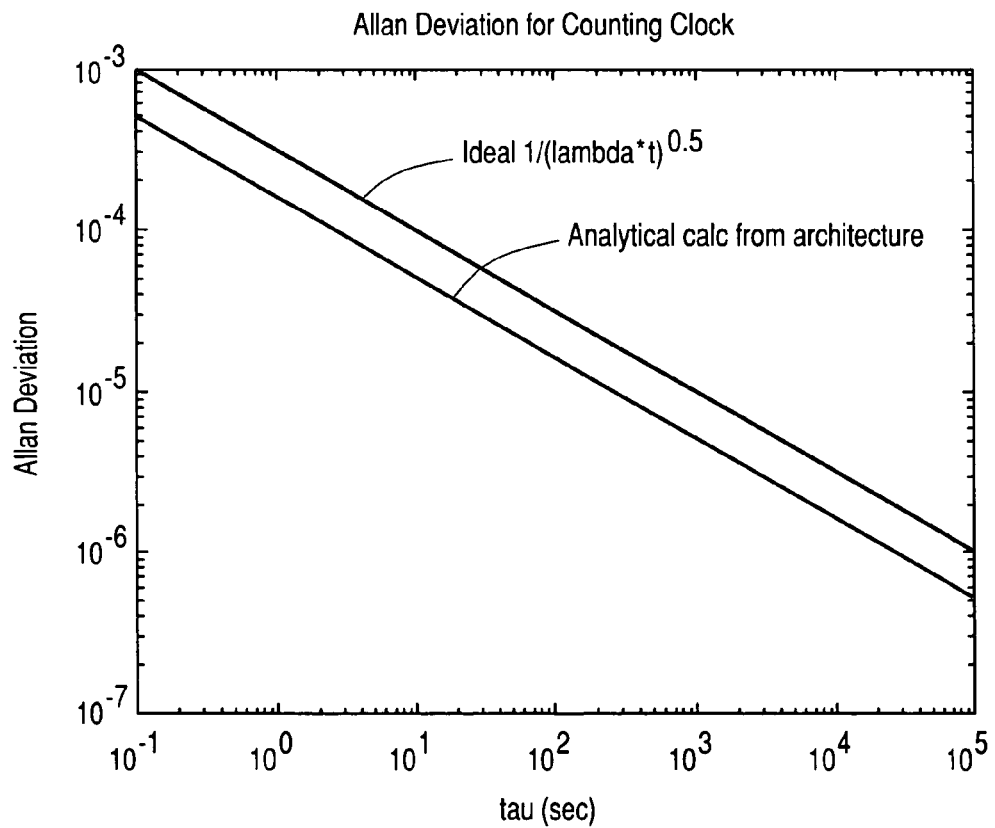
FIG. 5 is a graph that illustrates the Allan deviation of the simple counting clock of FIG. 3, compared with a derived standard.

A comparison of an ideal Allan Deviation and the Allan Deviation of the system of the present invention is shown in FIG. 5.

The simplest embodiment of the counting clock of the present invention does have limitations. In principle, one can achieve Allan deviations comparable to state of the art chip-scale atomic clocks, but there are several practical problems which make this system difficult to implement. The first difficulty is detector speed, for from FIG. 2 it is seen that one can theoretically achieve an Allan deviation of $\sim 10^{-8}$ for a radioactive decay rate $\lambda$ of $10^{12}$ for intervals approaching one hour duration. However, this would mean that the detector and the counter would have to work at frequencies of over $10^{12}$ Hz or over 1 THz, which, at present, is simply not possible. At lower decay rates, a longer duration would be required to achieve the same Allan deviation as those from radioactive sources of higher decay rates.

A second difficulty is the power required to operate the detector 24. An alternative to circumventing the speed limitation of available detectors is to break down the detection into multiple detectors. For example, for $\lambda=10^{12}$, one can use 1000 detectors, each working at a frequency of ~1 GHz. Simple detector implementations from state-of-the-art electronics can provide enable detector speeds over 1 GHz. However, these would be relatively high-power-consuming devices, and would defeat the objective of achieving low power radioactive source-based clocks.

One problem that arises with many radiation-based devices is that of external radiation. Fortunately, this is not a problem with the present device, since the detector speed and power requirements are dominant issues as compared to those caused by safety, e.g., from radiation levels. Further, the detector can potentially absorb and thus detect all radioactive emissions, hence allowing no external radiation to reach the operator and/or the surroundings.

As noted above, the modeling of the radioactive decay as a Poisson process for the counting clock can be exploited to give insights into ways of decreasing the activity and time required to achieve a required Allan deviation in the frequency of the clock of the present invention. An important characteristic of the Poisson process is that the time intervals between successive radioactive decay detection events (hereafter, events) have an exponential distribution with parameter I. Thus the probability density function of the time-intervals between successive events is given by:

$$P(t) = \lambda e^{-\lambda t} \tag{36}$$

Figure 6:
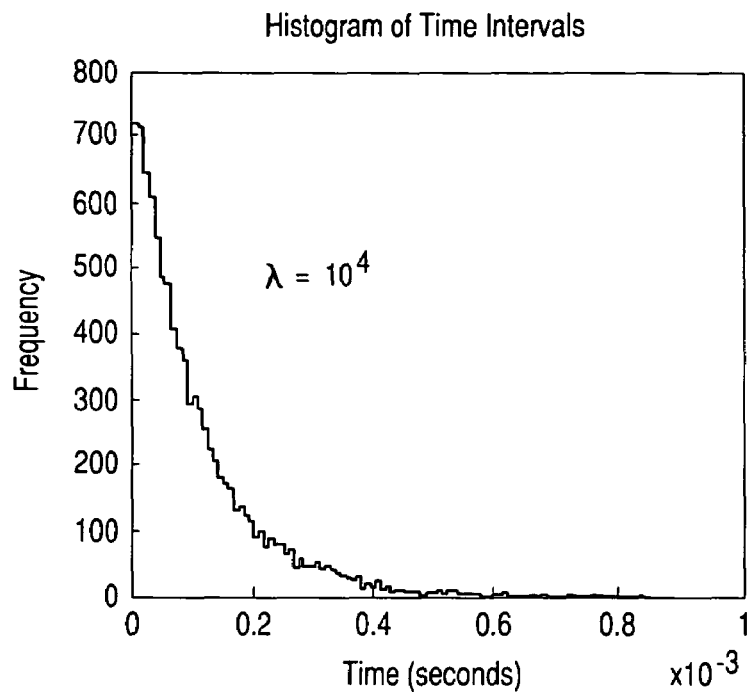
FIG. 6 illustrates a measured histogram of time intervals from a radioactive source of rate, $\lambda=10^4$, showing the exponential distribution of such intervals.

FIG. 6 illustrates plotted data for an experimental verification of the exponential time interval distribution; this data confirms the validity of Poisson process model of radioactive decay process.

It can be shown and expected that the average time interval for the Poisson process of parameter $\lambda$ is:

$$\overline{TI} = \frac{1}{\lambda} \tag{37}$$

This variation in the time intervals between successive pulses is what causes the standard deviation in the counts of the counting clock. This is equivalent to having a pure frequency source of frequency $\lambda$ with a Poisson noise as derived in equation 21.

Figure 7:
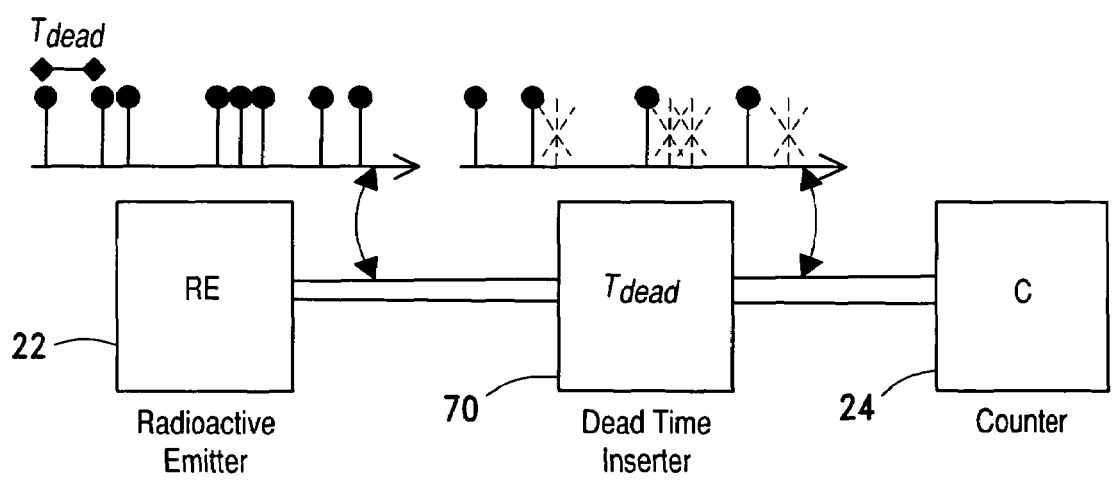
FIG. 7 is a schematic of a dead-time modified Poisson process detector/counter usable in the circuit of FIG. 3, showing pulses unregistered for a time=$T_{dead}$ after a previously registered pulse.

This observation led, in the present invention, to development of a Poisson noise reduction using dead time—Stochastic Resonance (SR) for the clock system of the present invention. As illustrated in FIG. 7, in an alternative embodiment of the present invention, a dead time inserter 70 is connected between the radioactive source 22 and the detector/counter 24 of the system of FIG. 3 to stabilize the detected periodic signal. Inserter 70 is a device that causes each radioactive event from source 22 to disable the detector for a selected constant time interval, called the dead-time, $T_{dead}$ following, and in response to, each detected radioactive emission, or event. There are two types of dead time that differ in their response to pulses arriving during a dead time: an extended dead tune, and a non-extended dead time. Pulses arriving during a non-extended dead time have no effect at all, while pulses arriving during an extended dead time will extend the dead time by $T_{dead}$, measured from the last arrival time.

Due to the exponential distribution of the time intervals of the radioactive decay process, most of the events occur within very short intervals of one-another. This requires very fast detectors (with response times <<1M, or operational speeds >>$\lambda$) to record events without missing any. In the absence of such a fast detector, there would be unpredictable counting losses that can lead to errors. One way of overcoming the unpredictability of the counting losses is to insert an artificial dead time in the detector, and FIG. 7 shows a schematic diagram of a radioactive detector with a non-extendable dead time, $T_{dead}$, the dead time interval is controlled by the dead time inserter 70.

There are several effects of introducing a dead-time inserter or stochastic resonator (SR) 70; for example:

Effect 1. The average count rate decreases when pulses are deleted by the dead time inserter (omitted pulses are shown in dashed lines in FIG. 7). The average count rate at the output of SR 70 (as $\lambda_{SR}$) is given by:

$$\lambda_{SR} = \frac{\lambda}{1 + \lambda T_{dead}} \tag{38}$$

Effect 2. The output pulses supplied to the counter tend occur more periodically (compared to the original radioactive decay process) with a period close to $T_{dead}$ (for $T_{dead} >> 1/\lambda$).

$$\lambda_{SR} = \frac{1}{\frac{1}{\lambda} + T_{dead}} \approx \frac{1}{T_{dead}} (\text{for } T_{dead} \gg 1/\lambda) \tag{39}$$

Effect 3. The probability density function of time intervals changes from an exponential distribution to that of a truncated exponential distribution.

$$P_{SR}(t) = \lambda e^{-\lambda(t - T_{dead})} \tag{40}$$

The dead time $T_{dead}$ can be expressed in terms of $\lambda$, such that $$T_{dead} = \frac{a}{\lambda} \tag{41}$$

FIGS. 8a-8d show the histogram of time intervals before and after the SR for $\lambda=10^4$, for different values of $\alpha$ (and hence $T_{dead}$).

Figure 9:
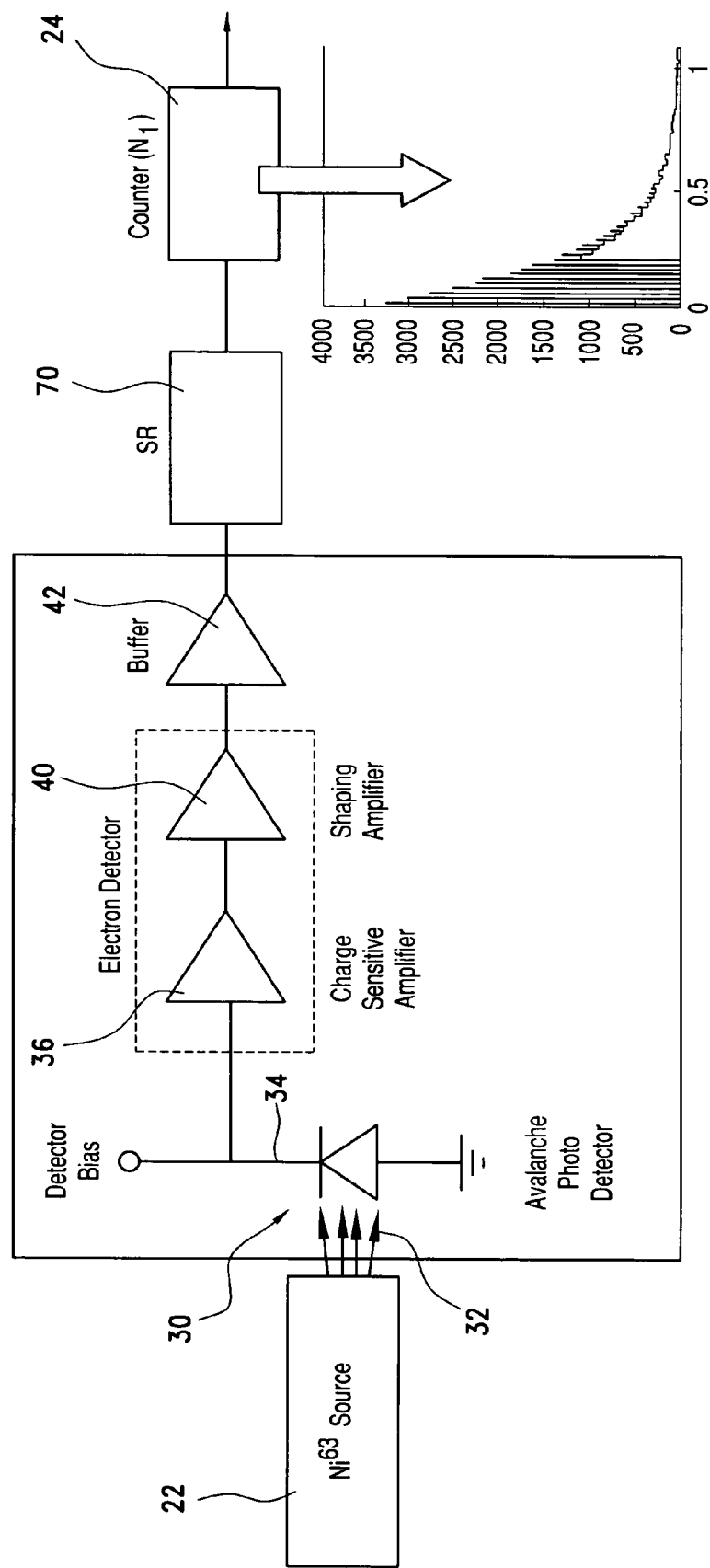
FIG. 9 is a schematic diagram of the detector of FIG. 4 incorporating a dead time (SR) to reduce Poisson noise, in accordance with the present invention.

FIG. 9 shows a schematic diagram for an embodiment of the clock system of the invention that incorporates a dead time inserter (SR) 70 in the circuit of FIG. 4 to reduce Poisson noise. The dead time for the detector can either (1) be implemented within the detector itself or (2) can be implemented as a separate block after the detector and before the counter, as illustrated.

There are several ways to implement a dead-time inserter 70. A simple way is the use of a monostable multivibrator and a bistable multivibrator in series. Each of these multivibrators can be realized using the commercially available IC 555. The datasheets of the several manufacturers of these devices describe the use of the IC 555 to build monostable and the bistable multivibrators. The $T_{dead}$ of the dead time inserter is equal to the product RC of the RC timing components which are external (to the IC 555) monostable multivibrator. The implementation of such a multivibrator is described in the publication "Application notes by Phillips semiconductors"

by the IC manufacturer (from web URL: http://www.standardics.philips.com/datasheets/).

The $T_{dead}$ of dead time inserter 70 is equal to the product RC of the external (to the IC 555) RC timing components in the monostable multivibrator.

For a given time t, (equation 38) the average value of count rate at the output of the SR is given by:

$$\overline{k_{SR}} = \frac{\lambda t}{1 + \lambda T_{dead}} = \frac{\lambda t}{1 + a} \quad (42)$$

$$\sigma_{SR}^2 = \frac{1}{(1+a)^3}\left[\lambda t + \frac{a^2(6 + 4a + a^2)}{6(1+a)}\right] \quad (43)$$

Figure 10:
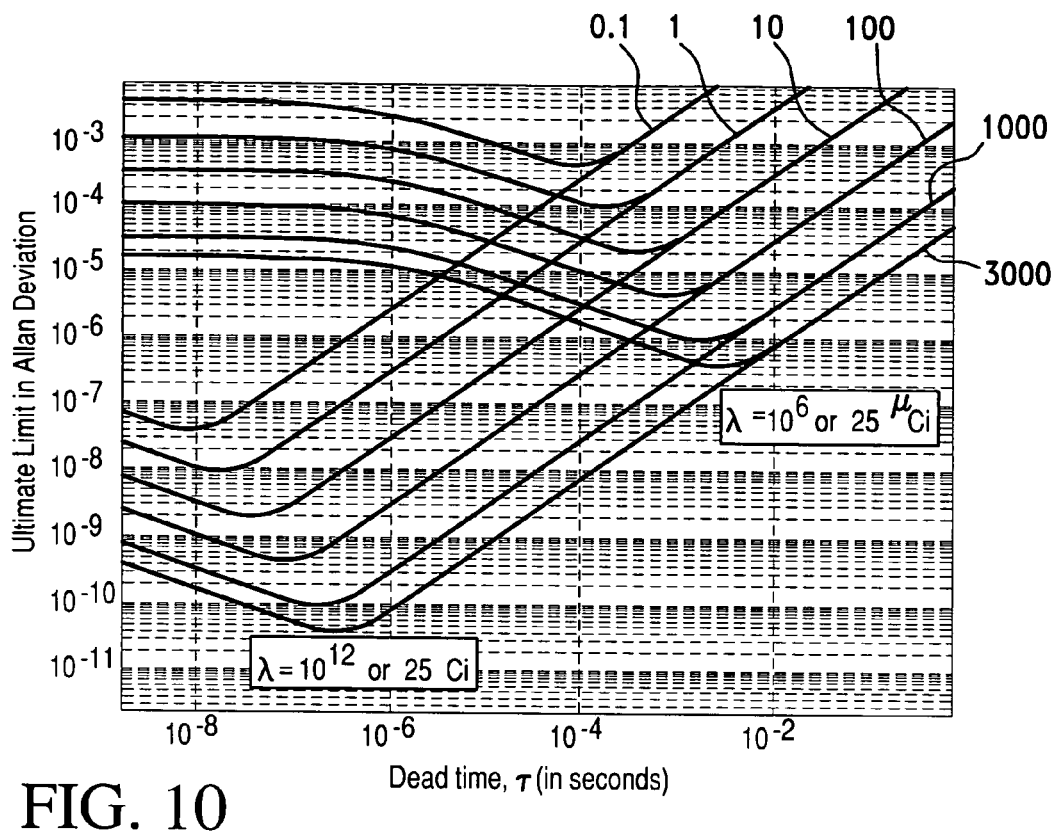
FIG. 10 illustrates the Allan deviation at the output of the dead time controlling attenuator SR of FIG. 9 for different times, as a function of $T_{dead}$, in accordance with the present invention.
Figure 11:
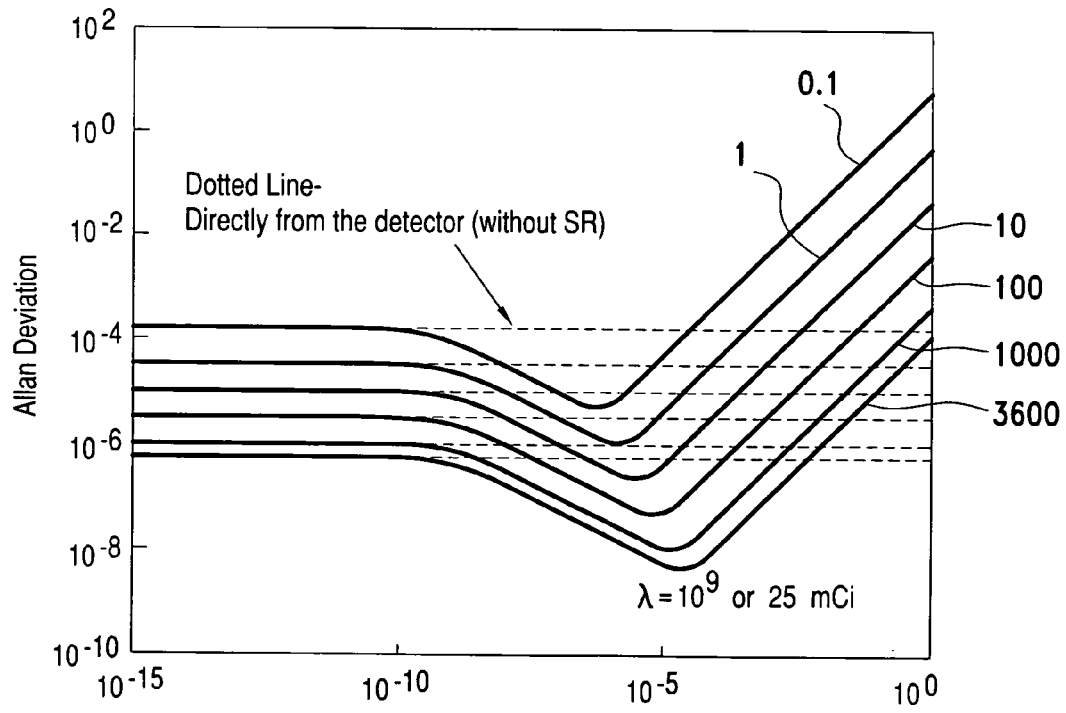
FIG. 11 illustrates the Allan deviation at the output of the SR of FIG. 9 for different times, as a function of $T_{dead}$, where the dotted lines indicate the Allan deviation without SR, in accordance with the present invention.
Figure 12:
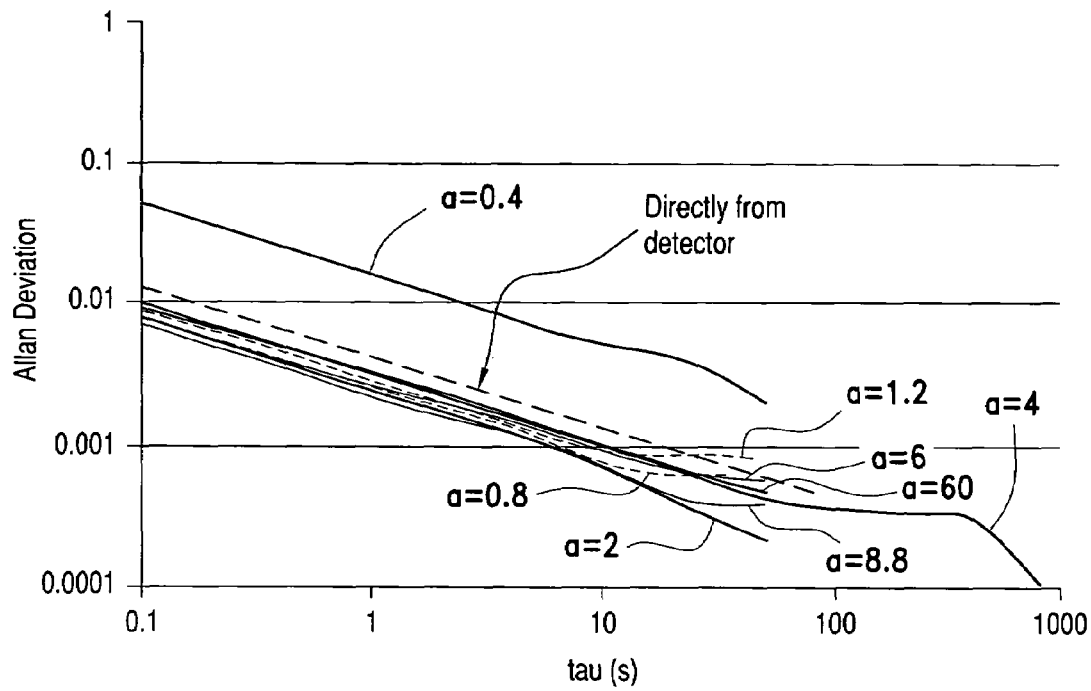
FIG. 12 illustrates an experimentally obtained Allan deviation as a function of time at the output of SR for different values of $T_{dead}$, in accordance with the present invention.

The Allan deviation of counts at the output of the SR 70 can be calculated from equations 42 and 43. Plotting the Allan deviation as a function of $T_{dead}$ reveals that there exists a minimum in the Allan deviation for a given value of counter gate time (how long the counter counts—t). FIG. 10 illustrates the values of $T_{dead}$ for the minimum values of Allan deviation and for different values of t, for two different rates, $\lambda$. In the illustrated example, one can see that for $\lambda=10^{12}$, an Allan deviation of $10^{-11}$ corresponds to an integration time of 1 hour (t=3600) using a value of $T_{dead}=2\times10^{-7}$ sec or 200 nsec. FIG. 11 shows the same for $\lambda=10^9$ or 25 mCi. The figure also compares the Allan deviation of the clock with (solid lines) and without (dotted lines) the SR.

In addition to improvements in the Allan deviation with SR, the use of the SR also means that the detector only needs to work with a frequency greater than $1/T_{dead}$ (in contrast to $1/\lambda$). In the case of the example considered above, the detector needs to work at a frequency of $\sim 1/200$ ns=5 MHz which potentially will consume very little power.

For an experimental verification of SR, the reduction in Allan deviation utilizing SR is verified in the experimental measurement of counts at the output of a radioactive detector with dead time. The rate $\lambda=10^4$ and the values of $T_{dead}$ time is varied. As predicted by equations 42 and 43 and FIGS. 10 and 11, the Allan deviation first decreases to a minimum value before increasing as one increases $T_{dead}$.

Figure 13:
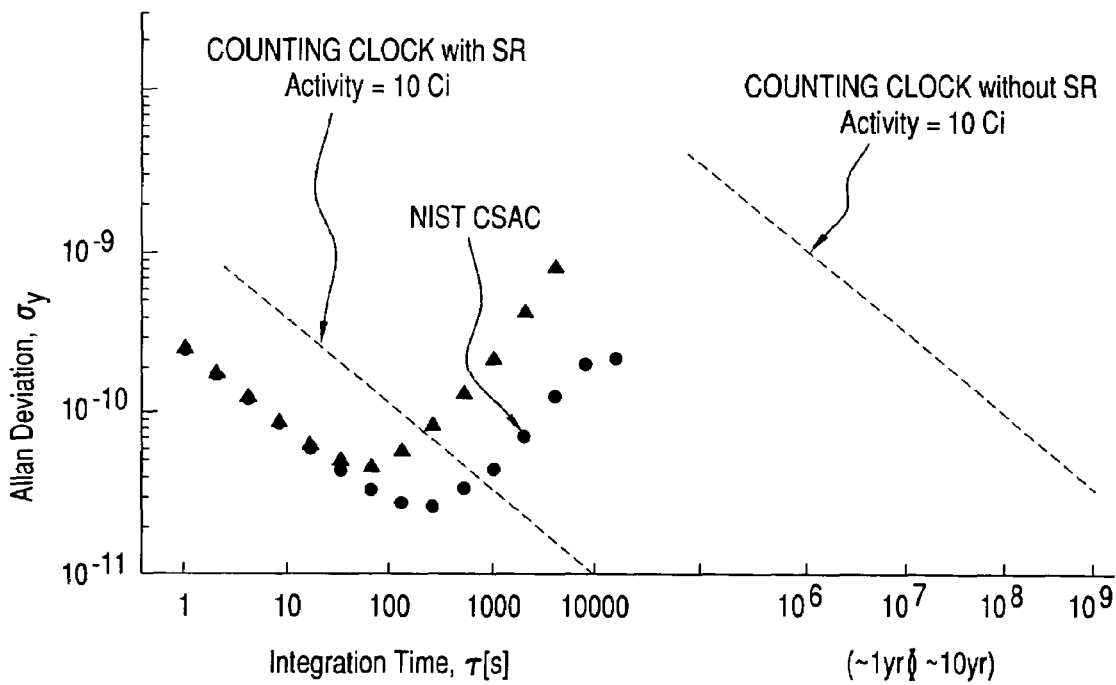
FIG. 13 illustrates a comparison of the Allan deviation for the counting clock of the present invention to that reported for a MEMS-based Chip-scale atomic clock (CSAC).

Returning now to the application of the system of the present invention to counting clocks having a performance that is comparable to state-of-the-art MEMS atomic clocks, FIG. 13 compares the Allan deviation with ($1^{st}$ dotted line) and without SR ($2^{nd}$ dotted line) for a counting clock to that of a chip-scale atomic clock (CSAC). Although the Allan deviation values are comparable in the two, the counting clock using the methods of the present invention will require relatively low power for operation. Further, due to this counting clock's immunity to environmental fluctuations, the clock is truly stable for longer times than those of CSACs which typically exhibit a turn around point corresponding to a drift in the frequency due to physical package aging and environmental effects. The clock and method of the present invention therefore provide more stability than comparable CASC clocks.

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A signal source generating a stable periodic signal, for use as a frequency source or time keeping signal source, comprising:
   a radioactive emission source generating a first signal corresponding to a selected radioactive material's disintegration rate;
   a detector responsive to said first signal, generating a radioactive emission detection signal in response to said first signal; and
   a dead time controlling attenuator responsive to said radioactive emission detection signal, attenuating said radioactive emission detection signal for a selected dead time interval in response to a periodic radioactive emission detection signal component; wherein said dead time controlling attenuator output comprises a stable radioactive emission periodic signal.

2. The signal source of claim 1, further comprising:
   an adjustable oscillator generating a second signal, said second signal having a controllable period or frequency;
   a comparison circuit responsive to said stable radioactive emission periodic signal and to said second signal, generating a control signal in response thereto; and
   wherein said adjustable oscillator controls said second signal's period or frequency in response to said comparison circuit's control signal.

3. The signal source of claim 2, wherein said comparison circuit comprises:
   a first counter responsive to said stable radioactive emission periodic signal and generating a first counter signal in response thereto; and
   a second counter responsive to said adjustable oscillator's second signal and generating a second counter signal in response thereto.

4. The signal source of claim 3, wherein said second counter signal is subtracted from said first counter signal to generate an error signal.

5. The signal source of claim 4, wherein said comparison circuit further comprises a feedback control circuit responsive to said error signal, generating said control signal in response thereto.

6. The signal source of claim 3, further comprising an up-down counter having an up-count input responsive to one of said first counter signal and second counter signal and having a down-count input responsive to the other of said first counter signal and second counter signal, said up-down counter generating an up-down error signal in response thereto.

7. The signal source of claim 6, wherein said comparison circuit further comprises a feedback control circuit responsive to said up-down error signal, generating said control signal in response thereto.

8. The signal source of claim 1, wherein said selected radioactive material comprises a beta emitter.

9. The signal source of claim 8, wherein said selected radioactive material comprises $Ni^{63}$.

10. The signal source of claim 9, wherein said selected radioactive material comprises a thin film of $Ni^{63}$ on a substrate.

11. The signal source of claim 9, wherein said selected radioactive material comprises a thin film of $Ni^{63}$ electroplated on a substrate to have activity approximating 25mCi/$cm^2$ of area.

12. The signal source of claim 8, wherein said selected radioactive material comprises Tritium.

13. The signal source of claim 1, wherein said a detector for generating said radioactive emission detection signal in response to said first signal comprises:
- an avalanche photo detector biased to detect said emission source's first signal and generating a beta decay signal in response thereto;
- a charge sensitive amplifier responsive to said beta decay signal and generating an amplified signal in response thereto;
- a shaping amplifier responsive to said amplified signal and generating a shaped signal in response thereto; and
- a buffer stage responsive to said shaped signal and generating said radioactive emission detection signal in response thereto.

14. A reference signal source comprising a radioactive emission source generating a substantially periodic signal corresponding to a selected radioactive material's disintegration or decay rate, and a detector responsive to said radioactive emission, said detector generating a stable periodic signal, for use as a frequency source or time keeping reference signal source; and
- further comprising a dead time controlling attenuator responsive to said radioactive emission, attenuating the detector's signal for a selected dead time interval in response to a periodic radioactive emission detection signal; wherein said dead time controlling attenuator output comprises a stable radioactive emission periodic signal.

15. The reference signal source of claim 14, further comprising a an adjustable oscillator generating a second signal, said second signal having a controllable period or frequency;
- a comparison circuit responsive to said stable radioactive emission periodic signal and to said second signal, generating a control signal in response thereto; and
- wherein said adjustable oscillator controls said second signal's period or frequency in response to said comparison circuit's control signal.

16. The reference signal source of claim 15, wherein said comparison circuit comprises:
- a first counter responsive to said stable radioactive emission periodic signal and generating a first counter signal in response thereto; and
- a second counter responsive to said adjustable oscillator's second signal and generating a second counter signal in response thereto;
- wherein said second counter signal is subtracted from said first counter signal to generate an error signal; and
- wherein said comparison circuit further comprises a feedback control circuit responsive to said error signal, generating said control signal in response thereto.

17. A method for generating a stable periodic signal for use as a frequency source or time keeping signal source, comprising the method steps of:
- (a) providing a radioactive emission source generating a first signal corresponding to a selected radioactive material's disintegration rate;
- (b) providing a detector responsive to said first signal, generating a radioactive emission detection signal in response to said first signal; and
- (c) providing a dead time controlling attenuator responsive to said radioactive emission detection signal; and
- (d) attenuating said radioactive emission detection signal for a selected dead time interval in response to a periodic radioactive emission detection signal component; wherein said dead time controlling attenuator output comprises a stable radioactive emission periodic signal.

* * * * *